(12) United States Patent
Feng et al.

(10) Patent No.: US 8,828,314 B2
(45) Date of Patent: *Sep. 9, 2014

(54) HOT-DIP PLATING ALLOY CONTAINING AL—SI—ZN—RE—MG—FE—CU—MN—CR—ZR AND PREPARATION METHOD THEREOF

(75) Inventors: Lixin Feng, Jiangsu (CN); Minyan Zhang, Jiangsu (CN); Pingze Zhang, Jiangsu (CN)

(73) Assignee: Jiangsu Linlong New Materials Co., Ltd., Rongdong Village, Yuqi Town, Huishan, Wuxi, Jiangsu (CN)

( * ) Notice: Subject to any disclaimer, the term of this patent is extended or adjusted under 35 U.S.C. 154(b) by 454 days.

This patent is subject to a terminal disclaimer.

(21) Appl. No.: 13/127,230

(22) PCT Filed: Mar. 31, 2010

(86) PCT No.: PCT/CN2010/071487
§ 371 (c)(1),
(2), (4) Date: May 2, 2011

(87) PCT Pub. No.: WO2011/079556
PCT Pub. Date: Jul. 7, 2011

(65) Prior Publication Data
US 2012/0224993 A1 Sep. 6, 2012

(30) Foreign Application Priority Data

Dec. 28, 2009 (CN) .......................... 2009 1 0262737

(51) Int. Cl.
| | | |
|---|---|---|
| *C22C 21/02* | (2006.01) | |
| *C22C 21/16* | (2006.01) | |
| *C22C 21/18* | (2006.01) | |
| *C22C 1/02* | (2006.01) | |
| *B82Y 30/00* | (2011.01) | |
| *C23C 2/12* | (2006.01) | |
| *C23C 2/04* | (2006.01) | |
| *C22C 1/10* | (2006.01) | |
| *C22C 32/00* | (2006.01) | |

(52) U.S. Cl.
CPC . *C23C 2/12* (2013.01); *C22C 1/026* (2013.01); *C23C 2/04* (2013.01); *B22F 2999/00* (2013.01); *B82Y 30/00* (2013.01); *C22C 1/1036* (2013.01); *C22C 32/0036* (2013.01); *C22C 21/02* (2013.01); *Y02T 50/67* (2013.01)
USPC ........... 420/548; 420/540; 420/542; 427/436; 427/405

(58) Field of Classification Search
USPC ......................................................... 420/532
See application file for complete search history.

(56) References Cited

U.S. PATENT DOCUMENTS

| | | | | |
|---|---|---|---|---|
| 5,789,089 A | * | 8/1998 | Maki et al. .................... | 428/623 |
| 2008/0026157 A1 | * | 1/2008 | Jung et al. ..................... | 427/409 |
| 2011/0300374 A1 | * | 12/2011 | Feng et al. .................... | 428/332 |

FOREIGN PATENT DOCUMENTS

| | | | |
|---|---|---|---|
| JP | 06116748 A | * | 4/1994 |
| WO | PCT/CN2010/071487 | | 10/2010 |

OTHER PUBLICATIONS

Machine translation of JP06116748 A. Apr. 1994.*
Machine translation of JP06116748A. Apr. 1994.*

* cited by examiner

*Primary Examiner* — Roy King
*Assistant Examiner* — Xiaowei Su
(74) *Attorney, Agent, or Firm* — Global IP Services; Tianhua Gu

(57) ABSTRACT

The invention relates to a special hot-dip plating alloy for a coating on the surface of a titanium alloy part, wherein the hot-dip plating alloy contains the following components by mass percentage: 8-24% of Si, 1.2-3.1% of Zn, 0.02-0.5% of RE, 0.5-3.2% of Mg, 0.05-1% of Fe, 0.05-0.5% of Cu, 1.0-2.0% of Mn, 0.5-2.0% of Cr, 0.02-0.5% of Zr, 1-2% of nano-oxide particle reinforcing agent and the balance of Al and inevitable impurities, and the nano-oxide particle reinforcing agent is selected from one or two of $TiO_2$ and $CeO_2$. The adoption of the hot-dip plating alloy produced by the invention can form the coating which has corrosion resistance and good wear resistance, and is well metallurgically bonded with a matrix on the surface of the titanium alloy.

10 Claims, No Drawings

HOT-DIP PLATING ALLOY CONTAINING AL—SI—ZN—RE—MG—FE—CU—MN—CR—ZR AND PREPARATION METHOD THEREOF

CROSS REFERENCE TO RELATED PATENT APPLICATION

The present application is the US national stage of PCT/CN2010/071487 filed on Mar. 31, 2010, which claims the priority of the Chinese patent application No. 200910262737.X filed on Dec. 28, 2009, which application is incorporated herein by reference.

FIELD OF THE INVENTION

The invention relates to a hot-dip plating alloy containing Al—Si—Zn—RE-Mg—Fe—Cu—Mn—Cr—Zr for a coating on the surface of a titanium alloy part and a preparation method thereof.

BACKGROUND OF THE INVENTION

Titanium alloy has become an important aviation material due to the advantages of high strength, high corrosion resistance and the like. The use of the titanium alloy is of great significance for reducing the weight of an aircraft and upgrading the performances of the aircraft. Although the titanium alloy has good corrosion resistance, when the titanium alloy is in contact with aluminum alloy and alloy steel, the titanium alloy is prone to produce the contact corrosion and thus causes the failure under the synergic action of stress and environment.

The contact corrosion is galvanic corrosion, that is when dissimilar metals are in contact in a same medium, the dissolution rate of the metal with the lower potential is accelerated due to the different metal potentials, thereby causing the local corrosion in the contact position. The fundamental measure for controlling the contact corrosion is to lead the potentials of the dissimilar materials in contact to be close to each other and further reduce or eliminate the contact corrosion by reasonably selecting the material of a coating and appropriately carrying out surface modification and surface plating and coating treatment.

Although the studies in the prevention of the contact corrosion of the titanium alloy at home and abroad have obtained certain achievements, there are still certain problems existing in the current means, and the main problem is that the adopted coating is very easy to lose the protective effect under the synergic action of the environment and the stress, the conventional plated coating on the surface of the titanium alloy is very easy to peel off and lose the anti-corrosion role under the action of contact loads, and debris peeling off the coating can lead the parts in contact to form abrasive wear and further accelerate the failure rate of the parts. Therefore, the problem urgent to be solved for a large number of titanium alloy fasteners in the aircraft is the failure problem caused by the contact corrosion.

SUMMARY OF THE INVENTION

The invention aims at providing a hot-dip plating alloy for a coating on the surface of a titanium alloy part, the anti-contact corrosion coating prepared by adopting the hot-dip plating alloy can not peel off even under the action of harsh environment and stress, and the anti-contact corrosion performance is also greatly improved, thereby thoroughly solving the problem of the contact corrosion between titanium alloy and aluminum alloy or steel material. The special hot-dip plating alloy for the coating on the surface of the titanium alloy part contains the following components by mass percentage: 8-24% of Si, 1.2-3.1% of Zn, 0.02-0.5% of RE, 0.5-3.2% of Mg, 0.05-1% of Fe, 0.05-0.5% of Cu, 1.0-2.0% of Mn, 0.5-2.0% of Cr, 0.02-0.5% of Zr, 1-2% of nano-oxide particle reinforcing agent and the balance of Al and inevitable impurities, and the nano-oxide particle reinforcing agent is selected from one or two of $TiO_2$ and $CeO_2$.

Preferably, if the adopted nano-oxide reinforcing agent particles are uniform spherical particles, the specific surface area and the average particle size of the spherical particles meet the following relation expression:

$$\text{Specific surface area} = \frac{6}{\rho \cdot D} (m^2/g)$$

Where D represents the average particle size; and ρ represents density.

If the shape of the adopted nano-oxide reinforcing agent particles is more complex than that of the common spherical particles, the performances and the effects of the coating can be even better; therefore, more preferably, the specific surface area of the nano-oxide reinforcing agent is larger than the calculated value according to the above expression:

Preferably, when the nano-oxide particles are $TiO_2$, the average particle size of the $TiO_2$ is 15-60 nm.

Preferably, when the nano-oxide particles are $TiO_2$, the specific surface area of the $TiO_2$ is 20-90 $m^2/g$.

Preferably, when the nano-oxide particles are $CeO_2$, the average particle size of the $CeO_2$ is 25-70 nm.

Preferably, when the nano-oxide particles are $CeO_2$, the specific surface are of the $CeO_2$ is 10-80 $m^2/g$.

Preferably, when the nano-oxide particle reinforcing agent consists of $TiO_2$ and $CeO_2$, the mass ratio of $TiO_2$ to $CeO_2$ is 1:(1-3).

More preferably, the mass ratio of $TiO_2$ to $CeO_2$ is 1:2.

Preferably, the mass percentage of each component is as follows: Si: 12-20%, Zn: 1.5-2.5%, RE: 0.1-0.3%, Mg: 1-2.5%, Fe: 0.2-0.8%, Cu: 0.2-0.4%, Mn: 1.5-2.0%, Cr: 0.8-2.0%, Zr: 0.1-0.4% and nano-oxide particle reinforcing agent: 1.2-1.8%.

In addition, the invention further provides a method for fabricating the hot-dip plating alloy, which comprises the steps of firstly heating an Al—Si alloy to 750-800° C. for full melting in a melting furnace under protective atmosphere, further raising temperature to 845-855° C., then adding RE, uniformly stirring, further heating and raising the temperature to 860-880° C., then adding Zn, cooling to 700-750° C., further simultaneously adding the nano-oxide particle reinforcing agent and Mg, Fe, Cu, Mn, Cr and Zr, carrying out mechanical and electromagnetic compounding, uniformly stirring, and further cooling to 700-650° C., keeping the temperature for 20-30 minutes and finally obtaining the hot-dip plating alloy.

Wherein, the heating rate is 10-40° C./minute during the heating process, and the cooling rate is 20-60° C./minute during the cooling process.

The adopted Al—Si coating is an effective coating for preventing the corrosion, in particular to the high-temperature corrosion of the titanium alloy, wherein Al is mainly used for providing the anti-corrosion performance under high-temperature situation and the durable anti-corrosion performance; and Si can further improve the wear resistance and the anti-high temperature corrosion property of the coating.

However, along with the increase of the Si content, the toughness of the coating is decreased, thereby being unfavorable to contact corrosion resistance under the synergic action of loads and a medium. Therefore, the invention adds the nano-oxide particle reinforcing agent, thereby refining grains of the coating, significantly improving the toughness and simultaneously improving the anti-contact corrosion ability. In addition, the invention can further significantly improve the resistance of the coating to atmospheric corrosion, electrochemical corrosion and airflow scouring erosion, significantly improve the strength and the hardness of the coating and further endue the coating with better anti-scour performance.

Further, through a larger number of repeated experiments and selections, the anti-contact corrosion ability of the coating can be remarkably improved by selecting the proper particle size and the specific surface area of the nano-oxide particle reinforcing agent. Moreover, the adoption of the particle size of the nano-oxide particle reinforcing agent being within the numerical range of the invention can further improve the wear resistance of the coating, and the adoption of the specific surface area of the nano-oxide particle reinforcing agent being within the numerical range of the invention can greatly increase the aggregation degree of the alloy, and further improve the anti-scour performance of the alloy coating more significantly.

In addition, the further adding of Zn into the coating can provide great cathodic protection for the coating, while RE can further refine crystal grains of the alloy and enhance the wear resistance and the liquid fluidity of the alloy.

On this basis, microalloy elements such as Mg, Fe, Cu, Mn, Cr, Zr and the like are further added into the coating, and the adding of the microalloy elements can further refine the grains, improve the reinforcing phase in the coating, also play a solid solution role for the alloy, further improve the toughness and the stability of the coating and further improve the strong toughness and the corrosion resistance of the coating. In addition, Mg in the coating can improve the affinity and the corrosion resistance of the coating, as well as the room-temperature strength of the alloy, Fe can play a role of improving the oxidation resistance, Cu can improve the hardness and the bending strength, Mn can further improve the surface quality of the coating, Cr can improve the protection of an initial oxide film, and Zr can significantly refine the grain structure and improve the mechanical properties and the anti-corrosion performance of the coating.

On the other hand, the invention further provides the method for adding hot-dip plating alloy elements in multiple temperature sections, and the adoption of the method can be conductive to improving the dispersivity of the nano-oxide particle reinforcing agent and various elements along with the raise of the temperature, further improve the uniformity of the components of the coating and significantly improving the bonding strength between the coating and the matrix.

However, if all the elements are added when the temperature of melt is excessively high, the coating is easy to form the high-Al brittle phase, which is not conductive to bearing contact fretting loads. Therefore, the invention adopts the steps of adding part of the hot-dip plating alloy elements in multiple temperature sections, further decreasing the temperature to a certain temperature, further adding the nano-oxide particle reinforcing agent, further cooling and keeping the temperature for a certain time, thereby overcoming the above defects and obtaining the coating with uniform components and better toughness.

In summary, the invention can form the coating which has good corrosion resistance and good wear resistance and is well metallurgically bonded with the matrix on the surface of the titanium alloy by improving the alloy and the melting process thereof. The potential of the coating is close to that of the aluminum alloy and other materials, thereby preventing the contact corrosion between the titanium alloy part and the aluminum alloy, the high-temperature alloy or other aviation materials. The adoption of the anti-contact corrosion coating prepared by the hot-dip plating alloy can not peel off even under the action of the harsh environment and the stress, and the anti-contact corrosion performance is also greatly improved, thereby thoroughly solving the problem of the contact corrosion between the titanium alloy and the aluminum alloy or the steel material and having great significance in further expansion of the applications of the titanium alloy in the aviation field and promotion of the performances of the aircrafts.

DETAILED DESCRIPTIONS OF THE INVENTION

A special hot-dip plating alloy for a coating on the surface of a titanium alloy part, wherein the hot-dip plating alloy contains the following components by mass percentage: 8-24% of Si, 1.2-3.1% of Zn, 0.02-0.5% of RE, 0.5-3.2% of Mg, 0.05-1% of Fe, 0.05-0.5% of Cu, 1.0-2.0% of Mn, 0.5-2.0% of Cr, 0.02-0.5% of Zr, 1-2% of nano-oxide particle reinforcing agent and the balance of Al and inevitable impurities, and the nano-oxide particle reinforcing agent is selected from one or two of $TiO_2$ and $CeO_2$, and the inevitable impurities are usually impurity elements which can not be thoroughly removed, such as Pb, Sn, Cd and the like.

Further, through a larger number of repeated experiments and selections, the performances of the coating can be improved more significantly by selecting the proper particle size and the specific surface area of the nano-oxide particle reinforcing agent, and if the nano-oxide particles are spherical particles, the specific surface area and the average particle size of the spherical particles meet the following relation expression:

$$\text{Specific surface area } (m^2/g) = \frac{6}{\rho \cdot D}$$

Where D represents the average particle size; and
$\rho$ represents density.

Further, if the shape of the adopted nano-oxide reinforcing agent particles is more complex than that of the common spherical particles, the performances and the effects of the coating can be even better; therefore, more preferably, the specific surface area of the nano-oxide particles is larger than the calculated value according to the above expression.

Preferably, when the nano-oxide particles are $TiO_2$, the average particle size of the $TiO_2$ is 15-60 nm.

Preferably, when the nano-oxide particles are $TiO_2$, the specific surface area of the $TiO_2$ is 20-90 $m^2/g$.

Preferably, when the nano-oxide particles are $CeO_2$, the average particle size of the $CeO_2$ is 25-70 nm.

Preferably, when the nano-oxide particles are $CeO_2$, the specific surface are of the $CeO_2$ is 10-80 $m^2/g$.

Preferred embodiments about the mass percentage of each component of the invention are hereinafter given in Tables 1-3, however the content of each component of the invention is not limited to values in the Tables, and those skilled in the art can carry out reasonable generalization and deduction on the basis of the numerical ranges listed in the Tables.

It is necessary to be specifically described that although relative values of the particle size and the specific surface area of the nano-oxide particles are simultaneously listed in the Tables 1-3, the two conditions are not described as necessary conditions. As for the invention, the core content is to achieve the purposes of refining the grains of the coating, improving the toughness and the anti-contact corrosion ability and overcoming adverse effects caused by too high content of Si by adding a certain amount of the nano-oxide particle reinforcing agent. On this basis, further selection of the proper particle size and the specific surface area just aims at leading the technical effect to be more prominent and more superior, and thus, although listed in the Tables 1-3 simultaneously, the two parameters are merely described as more superior conditions for more detailed technical information of the invention rather than being described as the necessary conditions.

Embodiment 1

A special hot-dip plating alloy consists of Al, Si, Zn, Mg, Fe, Cu, Mn, Cr, Zr, RE and $TiO_2$ nano-oxide particle reinforcing agent, and the mass percentage of each component is as follows: Si: 8-24%, Zn: 1.2-3.1%, RE: 0.02-0.5%, Mg: 0.5-3.2%, Fe: 0.05-1%, Cu: 0.05-0.5%, Mn: 1.0-2.0%, Cr: 0.5-2.0%, Zr: 0.02-0.5%, $TiO_2$: 1-2%, and Al: the balance. The details are shown in Table 1.

TABLE 1

Mass Percentage (%) of Each Component in Total Mass and Relative Index Parameters

| | Element | | | | | | | | | | $TiO_2$ | | |
| --- | --- | --- | --- | --- | --- | --- | --- | --- | --- | --- | --- | --- | --- |
| Serial Number | Al | Si | Zn | Mg | Fe | Cu | Mn | Cr | Zr | RE | Content | Particle Size (nm) | Specific Surface Area ($m^2/g$) |
| 1 | Balance | 24 | 1.98 | 1.0 | 0.05 | 0.1 | 1.0 | 0.5 | 0.1 | 0.02 | 1.0 | 1.5 | 90 |
| 2 | Balance | 22 | 1.95 | 1.5 | 0.2 | 0.2 | 1.2 | 0.6 | 0.2 | 0.05 | 1.05 | 18 | 85 |
| 3 | Balance | 21 | 1.9 | 1.92 | 0.3 | 0.3 | 1.3 | 0.7 | 0.3 | 0.08 | 1.1 | 20 | 80 |
| 4 | Balance | 20 | 1.85 | 1.9 | 0.4 | 0.4 | 1.4 | 0.8 | 0.4 | 0.1 | 1.15 | 23 | 75 |
| 5 | Balance | 19 | 1.8 | 1.88 | 0.5 | 0.5 | 1.5 | 0.9 | 0.5 | 0.12 | 1.2 | 25 | 70 |
| 6 | Balance | 17 | 1.85 | 2.7 | 0.6 | 0.05 | 1.6 | 1.0 | 0.02 | 0.15 | 1.3 | 28 | 65 |
| 7 | Balance | 16 | 1.82 | 2.6 | 0.7 | 0.2 | 1.7 | 1.1 | 0.2 | 0.18 | 1.4 | 30 | 60 |
| 8 | Balance | 15 | 1.5 | 2.8 | 0.8 | 0.3 | 1.8 | 1.2 | 0.3 | 0.2 | 1.5 | 35 | 55 |
| 9 | Balance | 13 | 2.75 | 2.4 | 0.9 | 0.4 | 1.9 | 1.3 | 0.4 | 0.25 | 1.6 | 40 | 50 |
| 10 | Balance | 11 | 2.8 | 3.2 | 1.0 | 0.5 | 1.8 | 1.4 | 0.5 | 0.30 | 1.7 | 45 | 45 |
| 11 | Balance | 12 | 1.2 | 2.68 | 0.9 | 0.1 | 1.7 | 1.5 | 0.08 | 0.32 | 1.8 | 50 | 40 |
| 12 | Balance | 10 | 3 | 0.8 | 0.8 | 0.2 | 1.6 | 1.6 | 0.2 | 0.35 | 1.85 | 53 | 35 |
| 13 | Balance | 10 | 3.1 | 0.6 | 0.7 | 0.3 | 1.5 | 1.7 | 0.3 | 0.40 | 1.90 | 55 | 30 |
| 14 | Balance | 9 | 2.95 | 0.65 | 0.6 | 0.4 | 1.4 | 1.8 | 0.4 | 0.45 | 1.95 | 58 | 25 |
| 15 | Balance | 8 | 3.0 | 0.5 | 0.5 | 0.5 | 1.3 | 1.9 | 0.5 | 0.5 | 2 | 60 | 20 |

Embodiment 2

A special hot-dip plating alloy consists of Al, Si, Zn, Mg, Fe, Cu, Mn, Cr, Zr, RE and $CeO_2$ nano-oxide particle reinforcing agent, and the mass percentage of each component is as follows: Si: 8-24%, Zn: 1.2-3.1%, RE: 0.02-0.5%, Mg: 0.5-3.2%, Fe: 0.05-1%, Cu: 0.05-0.5%, Mn: 1.0-2.0%, Cr: 0.5-2.0%, Zr: 0.02-0.5%, $CeO_2$: 1-2%, and Al: the balance. The details are shown in Table 2.

TABLE 2

Mass Percentage (%) of Each Component in Total Mass and Relative Index Parameters

| | Element | | | | | | | | | | | $CeO_2$ | |
|---|---|---|---|---|---|---|---|---|---|---|---|---|---|
| Serial Number | Al | Si | Zn | Mg | Fe | Cu | Mn | Cr | Zr | RE | Content | Particle Size (nm) | Specific Surface Area (m$^2$/g) |
| 1 | Balance | 24 | 1.98 | 1.0 | 0.05 | 0.1 | 1.0 | 0.5 | 0.1 | 0.02 | 1.0 | 25 | 80 |
| 2 | Balance | 22 | 1.95 | 1.5 | 0.2 | 0.2 | 1.2 | 0.6 | 0.2 | 0.05 | 1.05 | 28 | 75 |
| 3 | Balance | 21 | 1.9 | 1.92 | 0.3 | 0.3 | 1.3 | 0.7 | 0.3 | 0.08 | 1.1 | 30 | 70 |
| 4 | Balance | 20 | 1.85 | 1.9 | 0.4 | 0.4 | 1.4 | 0.8 | 0.4 | 0.1 | 1.15 | 35 | 65 |
| 5 | Balance | 19 | 1.8 | 1.88 | 0.5 | 0.5 | 1.5 | 0.9 | 0.5 | 0.12 | 1.2 | 40 | 60 |
| 6 | Balance | 17 | 1.85 | 2.7 | 0.6 | 0.05 | 1.6 | 1.0 | 0.02 | 0.15 | 1.3 | 45 | 55 |
| 7 | Balance | 16 | 1.82 | 2.6 | 0.7 | 0.2 | 1.7 | 1.1 | 0.2 | 0.18 | 1.4 | 50 | 50 |
| 8 | Balance | 15 | 1.5 | 2.8 | 0.8 | 0.3 | 1.8 | 1.2 | 0.3 | 0.2 | 1.5 | 53 | 45 |
| 9 | Balance | 13 | 2.75 | 2.4 | 0.9 | 0.4 | 1.9 | 1.3 | 0.4 | 0.25 | 1.6 | 55 | 40 |
| 10 | Balance | 11 | 2.8 | 3.2 | 1.0 | 0.5 | 1.8 | 1.4 | 0.5 | 0.30 | 1.7 | 58 | 35 |
| 11 | Balance | 12 | 1.2 | 2.68 | 0.9 | 0.1 | 1.7 | 1.5 | 0.08 | 0.32 | 1.8 | 60 | 30 |
| 12 | Balance | 10 | 3 | 0.8 | 0.8 | 0.2 | 1.6 | 1.6 | 0.2 | 0.35 | 1.85 | 62 | 25 |
| 13 | Balance | 10 | 3.1 | 0.6 | 0.7 | 0.3 | 1.5 | 1.7 | 0.3 | 0.40 | 1.90 | 65 | 20 |
| 14 | Balance | 9 | 2.95 | 0.65 | 0.6 | 0.4 | 1.4 | 1.8 | 0.4 | 0.45 | 1.95 | 68 | 15 |
| 15 | Balance | 8 | 3.0 | 0.5 | 0.5 | 0.5 | 1.3 | 1.9 | 0.5 | 0.5 | 2 | 70 | 10 |

Embodiment 3

A special hot-dip plating alloy contains consists of Al, Si, Zn, Mg, Fe, Cu, Mn, Cr, Zr, RE and nano-oxide particle reinforcing agent, wherein nano-oxide particles consist of $TiO_2$ and $CeO_2$, and the ratio of $TiO_2$ to $CeO_2$ is 1:(1-3), and the mass percentage of each component is as follows: Si: 8-24%, Zn: 1.2-3.1%, RE: 0.02-0.5%, Mg: 0.5-3.2%, Fe: 0.05-1%, Cu: 0.05-0.5%, Mn: 1.0-2.0%, Cr: 0.5-2.0%, Zr: 0.02-0.5%, $TiO_2$ and $CeO_2$: 1-2%, and Al: the balance. The details are shown in Table 3.

In addition, a large number of repeated experiments show that if the loose packed density of the nano-oxide particle reinforcing agent is appropriately selected, the performances and the effects of the finally obtained coating can be more ideal.

If using $TiO_2$, preferably, the loose packed density of the $TiO_2$ is not more than 3 g/cm$^3$.

If using $CeO_2$, preferably, the loose packed density of the $CeO_2$ is not more than 5 g/cm$^3$.

TABLE 3

Mass Percentage (%) of Each Component in Total Mass and Relative Index Parameters

| | Element | | | | | | | | | | | $TiO_2$ and $CeO_2$ | |
|---|---|---|---|---|---|---|---|---|---|---|---|---|---|
| Serial Number | Al | Si | Zn | Mg | Fe | Cu | Mn | Cr | Zr | RE | Content ($TiO_2$:$CeO_2$) | Particle Size (nm) | Specific Surface Area (m$^2$/g) |
| 1 | Balance | 24 | 1.98 | 1.0 | 0.05 | 0.1 | 1.0 | 0.5 | 0.1 | 0.02 | 1.0 (1:1) | 20 | 80 |
| 2 | Balance | 22 | 1.95 | 1.5 | 0.2 | 0.2 | 1.2 | 0.6 | 0.2 | 0.05 | 1.05 (1:1.2) | 23 | 75 |
| 3 | Balance | 21 | 1.9 | 1.92 | 0.3 | 0.3 | 1.3 | 0.7 | 0.3 | 0.08 | 1.1 (1:1.3) | 25 | 70 |
| 4 | Balance | 20 | 1.85 | 1.9 | 0.4 | 0.4 | 1.4 | 0.8 | 0.4 | 0.1 | 1.15 (1:1.4) | 28 | 65 |
| 5 | Balance | 19 | 1.8 | 1.88 | 0.5 | 0.5 | 1.5 | 0.9 | 0.5 | 0.12 | 1.2 (1:1.3) | 30 | 60 |
| 6 | Balance | 17 | 1.85 | 2.7 | 0.6 | 0.05 | 1.6 | 1.0 | 0.02 | 0.15 | 1.3 (1:1.5) | 35 | 55 |
| 7 | Balance | 16 | 1.82 | 2.6 | 0.7 | 0.2 | 1.7 | 1.1 | 0.2 | 0.18 | 1.4 (1:2) | 40 | 50 |
| 8 | Balance | 15 | 1.5 | 2.8 | 0.8 | 0.3 | 1.8 | 1.2 | 0.3 | 0.2 | 1.5 (1:3) | 45 | 45 |
| 9 | Balance | 13 | 2.75 | 2.4 | 0.9 | 0.4 | 1.9 | 1.3 | 0.4 | 0.25 | 1.6 (1:2) | 50 | 40 |
| 10 | Balance | 11 | 2.8 | 3.2 | 1.0 | 0.5 | 1.8 | 1.4 | 0.5 | 0.30 | 1.7 (1:1.8) | 53 | 35 |
| 11 | Balance | 12 | 1.2 | 2.68 | 0.9 | 0.1 | 1.7 | 1.5 | 0.08 | 0.32 | 1.8 (1:1.5) | 55 | 30 |
| 12 | Balance | 10 | 3 | 0.8 | 0.8 | 0.2 | 1.6 | 1.6 | 0.2 | 0.35 | 1.85 (1:2) | 58 | 25 |
| 13 | Balance | 10 | 3.1 | 0.6 | 0.7 | 0.3 | 1.5 | 1.7 | 0.3 | 0.40 | 1.90 (1:2.5) | 60 | 20 |
| 14 | Balance | 9 | 2.95 | 0.65 | 0.6 | 0.4 | 1.4 | 1.8 | 0.4 | 0.45 | 1.95 (1:2.8) | 65 | 18 |
| 15 | Balance | 8 | 3.0 | 0.5 | 0.5 | 0.5 | 1.3 | 1.9 | 0.5 | 0.5 | 2 (1:3) | 68 | 15 |

In embodiments 1-3, preferably, the mass percentage of each component is as follows: Si: 12-20%, Zn: 1.5-2.5%, RE: 0.1-0.3%, Mg: 1-2.5%, Fe: 0.2-0.8%, Cu: 0.2-0.4%, Mn: 1.5-2.0%, Cr: 0.8-2.0%, Zr: 0.1-0.4% and nano-oxide particle reinforcing agent: 1.2-1.8%.

More preferably, the preferred Si content is 15-20%, 19% more preferably.

If using $TiO_2$ and $CeO_2$ simultaneously, preferably, the average loose packed density of the $TiO_2$ and the $CeO_2$ is 0.6-4.5 g/cm$^3$.

In addition, the invention further provides a method for fabricating the hot-dip plating alloy, comprising the steps of preparing materials according to the mass percentage of Al, Si, RE, Mg, Fe, Cu, Mn, Cr, Zr and the nano-oxide particle reinforcing agent, firstly heating an Al—Si alloy to 750-800° C. for full melting in a melting furnace under protective atmosphere, further raising temperature to 845-855° C., then adding RE, uniformly stirring, further heating and raising the temperature to 860-880° C., then adding Zn, cooling to 700-750° C., further simultaneously adding the nano-oxide particle reinforcing agent and Mg, Fe, Cu, Mn, Cr and Zr, carrying out mechanical and electromagnetic compounding, uniformly stirring, and further cooling to 700-650° C., keeping the temperature for 20-30 minutes and finally obtaining the hot-dip plating alloy.

Preferably, preparing the materials according to the mass percentage of Al, Si, Zn, RE, Mg, Fe, Cu, Mn, Cr, Zr and the nano-oxide particle reinforcing agent, firstly heating the Al—Si alloy to 780-800° C. for full melting in the melting furnace under the protective atmosphere, further raising the temperature to 850-855° C., then adding RE, uniformly stirring, further heating and raising the temperature to. 870-880° C., then adding Zn, cooling to 730-700° C., further simultaneously adding the nano-oxide particle reinforcing agent and Mg, Fe, Cu, Mn, Cr and Zr, carrying out mechanical and electromagnetic compounding, uniformly stirring, and further cooling to 680-650° C., and keeping the temperature for 20-25 minutes for obtaining the hot-dip plating alloy.

Preferably, cooling to 720-700° C. and then simultaneously adding the nano-oxide particle reinforcing agent and Mg, Fe, Cu, Mn, Cr and Zr; and finally cooling to 690-660° C. and keeping the temperature for 22-28 min for obtaining the hot-dip plating alloy.

More preferably, cooling to 710 and then simultaneously adding the nano-oxide particle reinforcing agent and Mg, Fe, Cu, Mn, Cr and Zr; and finally cooling to 680 and keeping the temperature for 25 min for obtaining the hot-dip plating alloy.

Wherein, the heating rate is 10-40° C./minute during the heating process, and the cooling rate is 20-60° C./minute during the cooling process.

Preferably, the heating rate is 20-30° C./minute during the heating process, and the cooling rate is 30-50° C./minute during the cooling process.

More preferably, the heating rate is 25° C./minute during the heating process, and the cooling rate is 40° C./minute during the cooling process.

Experimental Results of Bending Processing and Corrosion Resistance

Embodiment 4

A Ti6Al4V bolt which adopts the hot-dip plating alloy of the invention as a plating material for forming a coating with the thickness of 300 μm after treatment is in contact with an aluminum alloy, with reference to aviation standard HB5374, the standard galvanic corrosion test is carried out in 3% NaCl solution, the average galvanic current density is tested to be 0.74, achieving the B-level anti-corrosion standard, and the coating has no cracks during the test.

While the adoption of the conventional plating material causes the significant corrosion after only a few of months.

Embodiment 5

A TA6 part which adopts the hot-dip plating alloy of the invention as a plating material for forming a coating with the thickness of 200 μm after treatment is in contact with a GH30 part, with reference to aviation standard HB5374, the standard galvanic corrosion test is carried out in 3% NaCl solution, the average galvanic current density is tested to be 0.27, achieving the A-level anti-corrosion standard, and the coating has no cracks during the test.

While the adoption of the conventional plating material causes the significant corrosion after only a few of months.

In summary, the invention can form the coating which has good corrosion resistance and good wear resistance and is well metallurgically bonded with the matrix on the surface of the titanium alloy by improving the plating material and the plating process. Any proper improvements on the basis of the invention without departing from the spirit of the invention still fall within the protection scope of the invention.

What is claimed is:

1. A special hot-dip coating alloy on surfaces of titanium alloy parts comprising following components by mass percentage: 12-20% of Si, 1.5-2.5% of Zn, 0.1-0.3% of RE, 1-2.5% of Mg, 0.2-0.8% of Fe, 0.2-0.4% of Cu, 1.5-2.0% of Mn, 0.8-2.0% of Cr, 0.1-0.4% of Zr, 1.2-1.8% of nano-oxide particle reinforcing agents and a balance of Al and inevitable impurities, wherein the nano-oxide particle reinforcing agent consists of $TiO_2$ and $CeO_2$, and the mass ratio of $TiO_2$ to $CeO_2$ is 1: (1-3).

2. The hot-dip coating alloy according to claim 1, wherein the nano-oxide particle reinforcing agent is composed of uniform spherical particles, and the specific surface area and the average particle size of the nano-oxide particle reinforcing agent meet the following relation expression:

$$\text{Specific surface area } (m^2/g) = \frac{6}{\rho \cdot D}$$

Where D represents the average particle size; and
ρ represents density.

3. The hot-dip coating alloy according to claim 1, wherein the average particle size of the $TiO_2$ is 15-60 nm.

4. The hot-dip coating alloy according to claim 1, wherein the specific surface area of the $TiO_2$ is 20-90 $m^2/g$.

5. The hot-dip coating alloy according to claim 1, wherein the average particle size of the $CeO_2$ is 25-70 nm.

6. The hot-dip coating alloy according to claim 1, wherein the specific surface area of the $CeO_2$ is 10-80 $m^2/g$.

7. A method for fabricating the hot-dip plating alloy of claim 1 comprising steps of:
preparing materials according to the mass percentage of Al, Si, Zn, RE, Mg, Fe, Cu, Mn, Cr, Zr and the nano-oxide particle reinforcing agent described in claim 1,
heating an Al—Si alloy to 750-800° C. for full melting in a melting furnace under protective atmosphere,
raising the temperature to 845-855° C., then adding RE, and stirring evenly,
heating and raising the temperature to 860-880° C., then adding Zn,
cooling down to 750-700° C., then simultaneously adding nano-oxide particle reinforcing agent, Mg, Fe, Cu, Mn, Cr and Zr, and stirring evenly through a mechanical and electromagnetic uniformly stirring,
and further cooling down to 700-650° C., holding for 20-30 minutes and finally obtaining the hot-dip plating alloy according to claim 1.

8. The method according to claim 7, wherein the heating speed rate is 10-40° C./minute during the heating process, and the cooling speed rate is 20-60° C./minute during the cooling process.

9. The hot-dip coating alloy according to claim 3, wherein the specific surface area of the $TiO_2$ is 20-90 $m^2/g$.

10. The hot-dip coating alloy according to claim 5, wherein the specific surface area of the $CeO_2$ is 10-80 $m^2/g$.

* * * * *